Figure 1:
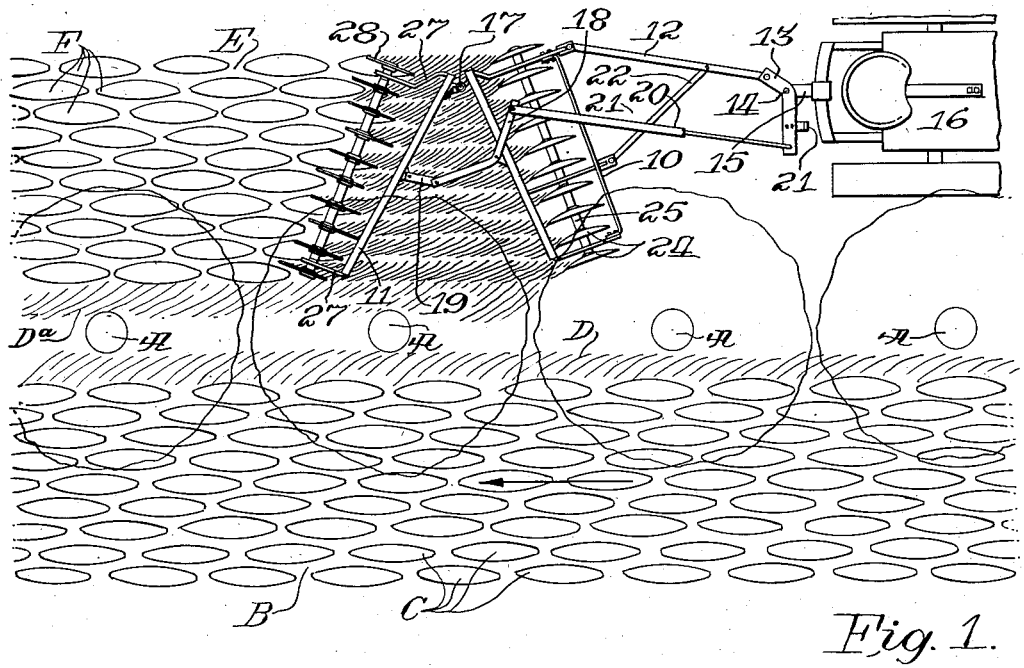

Oct. 13, 1942.                B. R. BENJAMIN                2,298,455
                                  HARROW
                            Filed Nov. 24, 1939

Inventor
Bert R. Benjamin
By Paul O. Rippel
Atty.

Patented Oct. 13, 1942

2,298,455

UNITED STATES PATENT OFFICE 2,298,455

HARROW

Bert R. Benjamin, Oak Park, Ill., assignor to International Harvester Company, a corporation of New Jersey Application November 24, 1939, Serial No. 305,840

6 Claims. (Cl. 55—83)

This invention relates to an agricultural implement, and more particularly to improvements in implements of the type generally known as orchard harrows.

The invention contemplates especially the provision of an implement designed for terracing operations in orchards or other instances where it is desirable to form a series of trenches or slopes and adjacent embankments or terraces. Heretofore so-called orchard harrows were utilized for the purposes of preparing the soil in a manner conducive to conservation of moisture and proper cultivation. These orchard harrows generally comprise front and rear gangs of disks, the gangs being drawn through the orchard closely adjacent the alined trunks of the trees in respective rows. The principal objection to this type of implement is that the disks on both gangs are concavo-convex, with the disks of the front and rear gangs respectively reversed; that is, the disks on the front gang were arranged to throw cut soil toward the tree trunks, and the disks on the rear gang were arranged to throw cut soil in the opposite direction. The ultimate result of such operation is that soil which is moved toward the trees is re-moved away from the trees during progress of the implement along the rows.

It will be appreciated that the results obtainable by the front gang alone would perhaps be desirable, were it not for the fact that the omission of the rear gang would complicate operation of the harrow in that the front gang could not then be guided. Without the rear gang, there would be no small difficulty in maintaining the front gang in proper trailing position. For this reason, then, it is found that the rear gang cannot be dispensed with.

The present invention provides an improved implement for the purposes of overcoming the previously mentioned problems and difficulties by the incorporation of an improved arrangement of disk-gangs. The results obtainable by this improved structure are satisfactory in that only a portion of the cut soil thrown toward the tree trunks by the disks of the front gang is re-moved by the disks of the rear gang. The disks on the rear gang include an additional feature in that they serve to provide pits or basins for retaining moisture and fertilizer.

The principal object of the present invention, then, is to provide an improved agricultural implement of the type referred to above.

An important object is to provide an improvement in a disk harrow wherein the disks of one gang are concavo-convex and the disks in the other gang are planar.

Another important object is to mount the rear disks on the disk supporting shaft in a manner presenting cutting edges for cutting the soil at varying depths.

Another object is to arrange certain of the rear disks to form pits or basins in the ridges formed at the sides of the furrows cut by the disks of the front gang.

Another object of the invention broadly, is to provide front and rear soil-cutting elements wherein the front element cuts a furrow and forms a ridge alongside thereof and the rear element moves portions of said ridge at intervals back into the furrow.

Briefly and specifically these and other important objects of the invention are achieved in one preferred embodiment thereof by the provision of a disk harrow comprising front and rear gangs. The front gang includes a plurality of concavo-convex disks adapted to form a series of furrows in the usual manner. This gang is, of course, angled to throw the cut soil in a direction according to the purposes of the particular use of the implement. The rear gang is angled in the opposite direction and includes a plurality of planar disks carried on a generally transverse mounting shaft. As an added feature, at least some of these planar disks are mounted on the shaft for rotation therewith respectively at points radially spaced from their centers, so that the disks will cut the soil at varying depths. The front and rear gangs are so arranged that the rear disks will move back only a portion of the soil cut out by the front disks in forming the furrows.

Figure 2:
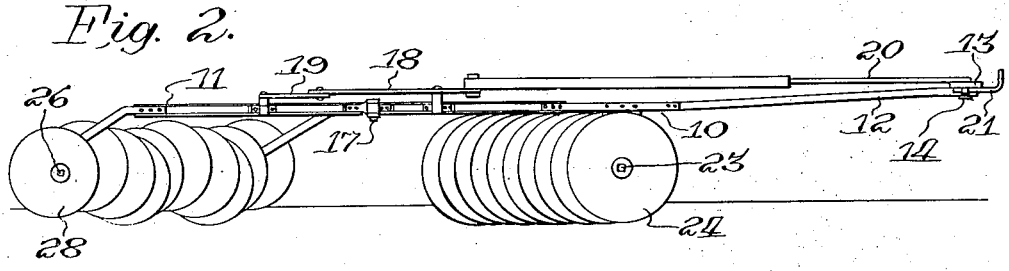

A more complete understanding of the objects and desirable features of the present invention may be had from the following detailed description taken in conjunction with the accompanying sheet of drawings in which:

Figure 1 is a plan view showing a preferred form of implement and the general results obtainable in the use thereof in orchard cultivation or terracing; and Figure 2 is a side elevational view of the implement showing the arrangement of the disks.

The implement comprises generally front and rear gangs or frames 10 and 11, respectively. The front frame or gang has connected thereto a longitudinally forwardly extending draft member 12, in turn pivotally connected to one arm of a transverse, horizontally disposed bell crank 13. The bell crank 13 is pivotally connected, as at 14, to a draw-bar 15 of a tractor or other draft vehicle 16. The two frames 10 and 11 are pivotally interconnected at their inner or left-hand ends, as at 17.

The front gang 10 pivotally carries at its rearwardmost frame member a bell crank 18, one arm of which is pivotally connected to a link 19 carried at the forward frame member of the rear gang 11, and the other arm of which is connected by a forwardly extending draft member 20 to the right-hand arm of the bell crank 18. The bell crank 13 is provided with a stop member 21 engageable with the tractor draw-bar when the tractor is backed. The draft member 12 is further connected to the front gang through the medium of a secondary draft member 22. This construction is generally conventional and for that reason has not been shown and described more in detail.

The front gang includes a generally transverse shaft 23 carried for rotation in appropriate bearings or journals. This shaft carries for rotation therewith a plurality of generally circular concavo-convex disks or elements 24. These disks are arranged in axially spaced relation on the shaft 23 and the spacing thereof is maintained by a plurality of spacing spools 25. The gang 10 is so angled and the disks 24 so arranged as to throw cut soil toward the outer or right-hand end of the gang. As shown in Figure 1, the implement is operated along a row of trees, generally indicated at A, so that the throw of the soil from the front gang is generally toward the tree trunks.

The rear gang 11 includes a generally transverse shaft 26 appropriately mounted for rotation in bearings or journals 27. The shaft has mounted thereon for rotation therewith a plurality of generally circular planar disks or elements 28. For purposes that will hereinafter appear, each disk 28 is preferably eccentrically mounted on the shaft; that is, the mounting point of each disk is a point radially spaced from its true center. This particular manner of mounting disks is disclosed in applicant's Patent No. 2,136,607 issued Nov. 15, 1938. The rear gang 11 is angled or arranged with respect to the front gang so that the soil cut by the disks thereof will be thrown generally toward the inner or left-hand side of the implement, or generally away from the row of trees A.

The operation of the implement is generally shown in Figure 1. The position of the implement in the above figure is that taken after the implement has been operated along the row of trees A in the opposite direction and at the other side thereof. During this first mentioned travel of the implement, one side of a terrace has been formed as at D, bordered by a terrace slope, generally indicated at B. As will be seen from the drawing, this slope is provided with a series of basins or pits C. The manner of forming this slope and terrace will appear presently from a description of the operation of the implement in connection with the formation of a terrace slope E at the opposite side of the row of trees A to form another side of the terrace D, as at Dᵃ.

The implement is drawn along the row of trees in the direction indicated, and, as previously mentioned, cut soil is thrown to the right or toward the row of trees A. This soil is cut and thrown by the front disks 24 as they cut a plurality of generally transversely spaced furrows, each furrow consequently having formed at its side a ridge of soil. In general, it may be said that the front gang serves to move a certain amount of soil toward the row of trees A. The rear gang 11, containing the planar disks 28, moves back only a portion of the soil moved by the front gang 10. Specifically, it may be said that each planar disk 28 breaks down or moves back a portion of the ridge formed by the corresponding disk 24 in the front gang. In short, each front disk cuts a furrow and forms a ridge and each respective rear disk trails therebehind and moves only a portion of the ridge of soil back into the furrow thus formed. Since each disk 28 is eccentrically mounted, portions of the respective ridge will be broken down or moved back at intervals as the rotation of the rear disk presents a varying cutting edge that cuts the ridge at varying depths. Because of the eccentric mounting of the disks 28 there is further formed thereby a plurality or series of basins or pits F. These basins or pits correspond to the basins or pits C formed in the slope B at the opposite side of the row of trees A. It will be noted that in general the basins or pits are not connected at their ends, so that intervening dams are formed therebetween. The pits are thus admirably adapted to contain fertilizer, to conserve moisture and to prevent soil erosion.

In order that the terrace may have its sides formed of considerable height alongside the rows of trees, it may be necessary to operate the implement over the same slope a number of times. In this manner the same furrows are generally cut deeper, and considerably larger portions of soil are moved toward the trees. This function is made possible by the provision of the planar disks 28 in the rear gang 11. Since these disks are planar, they do not move back as large amounts of soil as would concavo-convex disks in the ordinary arrangement. It will be understood that the planar disks may be concentrically mounted on the shaft 26 of the gang 11, and that the disks so mounted would not detract from the desirable results obtainable from the use of the implement insofar as the terracing alone is concerned. It will be appraent, of course, that the disks, so arranged, will not form the basins or pits. It is to be further understood that eccentrically-mounted concavo-convex disks could be utilized in the rear gang to some advantage, within scope of the invention including, as it does, the arrangement of the rear soil tilling part of the implement tilling elements adapted to move back only a portion of the soil moved to one side by the tilling elements of the front part of the implement.

It will be appreciated that the structure illustrated and described is that comprising a preferred embodiment of the invention and that numerous alterations and modifications may be made therein without departing from the spirit and scope of the invention as defined in the appended claims.

What is claimed is:

1. A tilling implement comprising front and rear gangs, each gang including a generally transverse shaft mounted for rotation, a plurality of concavo-convex disks carried at their centers by one shaft for rotation therewith, and a plurality of planar disks carried by and for rotation with the other shaft respectively at points spaced from their centers.

2. A tilling implement comprising front and rear gangs, each gang including a generally transverse shaft mounted for rotation, a plurality of disks carried at their centers by one shaft for rotation therewith, and a plurality of generally circular disks carried by and for rotation with the other shaft respectively at points spaced from their centers.

3. A tilling implement comprising front and rear frames, one frame including a plurality of soil-engaging elements generally spaced transversely of the direction of travel of the implement, the other frame including a generally transverse shaft mounted for rotation, and a plurality of planar disks carried by and for rotation with the shaft respectively at points spaced from their centers, said disks being arranged in axially spaced relation on the shaft.

4. A tilling implement comprising front and rear frames, one frame including a plurality of soil-engaging elements generally spaced transversely of the direction of travel of the implement, the other frame including a generally transverse shaft mounted for rotation, and a plurality of generally circular disks carried by and for rotation with the shaft respectively at points spaced from their centers, said disks being arranged in axially spaced relation on the shaft.

5. A tilling implement comprising front and rear gangs, each gang including a generally transverse shaft mounted for rotation, a plurality of concavo-convex disks carried by one shaft for rotation therewith, and a plurality of planar disks carried by and for rotation with the other shaft, each disk of one set being carried on the shaft at the disk center and each disk of the other set being carried on the other shaft at a point spaced from the disk center.

6. A tilling implement comprising a front frame including a plurality of disks for forming furrows and ridges, and a rear frame including a plurality of rotatable elements respectively alined with the disks in the front frame for following generally the said ridges, each element respectively having a pair of soil-cutting portions arranged to engage the ridge alternately at substantially each 180° of rotation, one portion having greater soil-cutting capacity than the other, said elements cutting greater and lesser portions of the ridges at intervals.

BERT R. BENJAMIN.